(12) United States Patent
Domerski

(10) Patent No.: US 9,968,224 B1
(45) Date of Patent: May 15, 2018

(54) CULINARY CUTTING GUIDE

(71) Applicant: Thomas Domerski, Easton, PA (US)

(72) Inventor: Thomas Domerski, Easton, PA (US)

( * ) Notice: Subject to any disclaimer, the term of this patent is extended or adjusted under 35 U.S.C. 154(b) by 0 days. days.

(21) Appl. No.: 15/424,301

(22) Filed: Feb. 3, 2017

(51) Int. Cl.
*A47J 43/28* (2006.01)
*G01B 3/02* (2006.01)
*G01B 3/14* (2006.01)

(52) U.S. Cl.
CPC ............... *A47J 43/28* (2013.01); *G01B 3/02* (2013.01); *G01B 3/14* (2013.01)

(58) Field of Classification Search
CPC .. A47J 43/28; G01B 3/02; G01B 3/14; G01B 3/04
USPC .................................... 33/565, 1 F
See application file for complete search history.

(56) References Cited

U.S. PATENT DOCUMENTS

| | | | | |
|---|---|---|---|---|
| 337,224 A * | 3/1886 | Albert | ...................... | G01B 3/30 33/562 |
| 375,949 A * | 1/1888 | Peterson | ............... | B43L 13/201 33/563 |
| 1,034,547 A * | 8/1912 | Welsh | ...................... | G01B 3/30 33/562 |
| 1,570,558 A * | 1/1926 | Durtsche | ................. | G01B 3/00 33/562 |
| 1,860,174 A * | 5/1932 | Cronk | ...................... | G01B 3/00 33/403 |
| 1,899,318 A * | 2/1933 | Dixon | ................... | B43L 13/205 33/563 |
| D141,882 S * | 7/1945 | Matson | ........................... | 33/565 |
| 2,579,857 A * | 12/1951 | Premo | ..................... | B43L 13/20 33/476 |
| 3,119,188 A * | 1/1964 | Orndorff | ............... | B43L 13/205 33/565 |
| 6,594,914 B1 * | 7/2003 | Babcock | .................. | A63C 3/10 33/535 |
| 7,603,787 B1 * | 10/2009 | Butler, III | ................. | B07C 1/10 33/501.45 |
| 8,448,552 B2 | 5/2013 | Hoffman | | |
| 2002/0100180 A1 * | 8/2002 | Montefusco | .......... | B43L 13/205 33/563 |
| 2008/0301965 A1 * | 12/2008 | Taylor | ................... | A47J 47/005 33/566 |
| 2013/0014626 A1 | 1/2013 | Jones | | |

OTHER PUBLICATIONS

Mercer Rules, p. 30, Mercer Culinary Product Catalog—2015.

* cited by examiner

*Primary Examiner* — Christopher Fulton
(74) *Attorney, Agent, or Firm* — Sanford J. Piltch

(57) ABSTRACT

A classic knife cut culinary guide for providing both visual and actual measurement comparison of classic knife cuts to standard size classic knife cuts provided as cutouts around the periphery and through the guide, as well as limited measurement indications in both English and metric units.

7 Claims, 3 Drawing Sheets

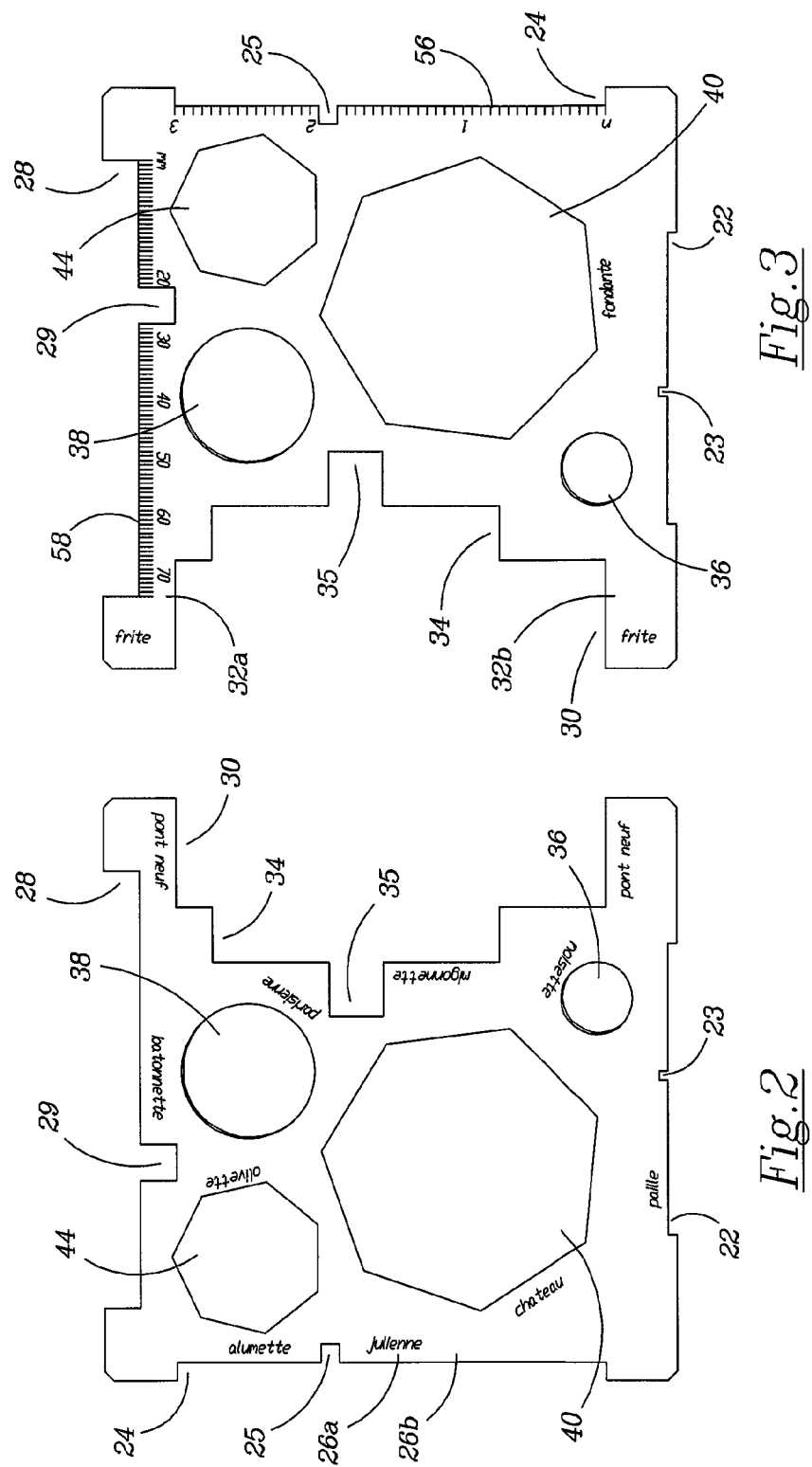

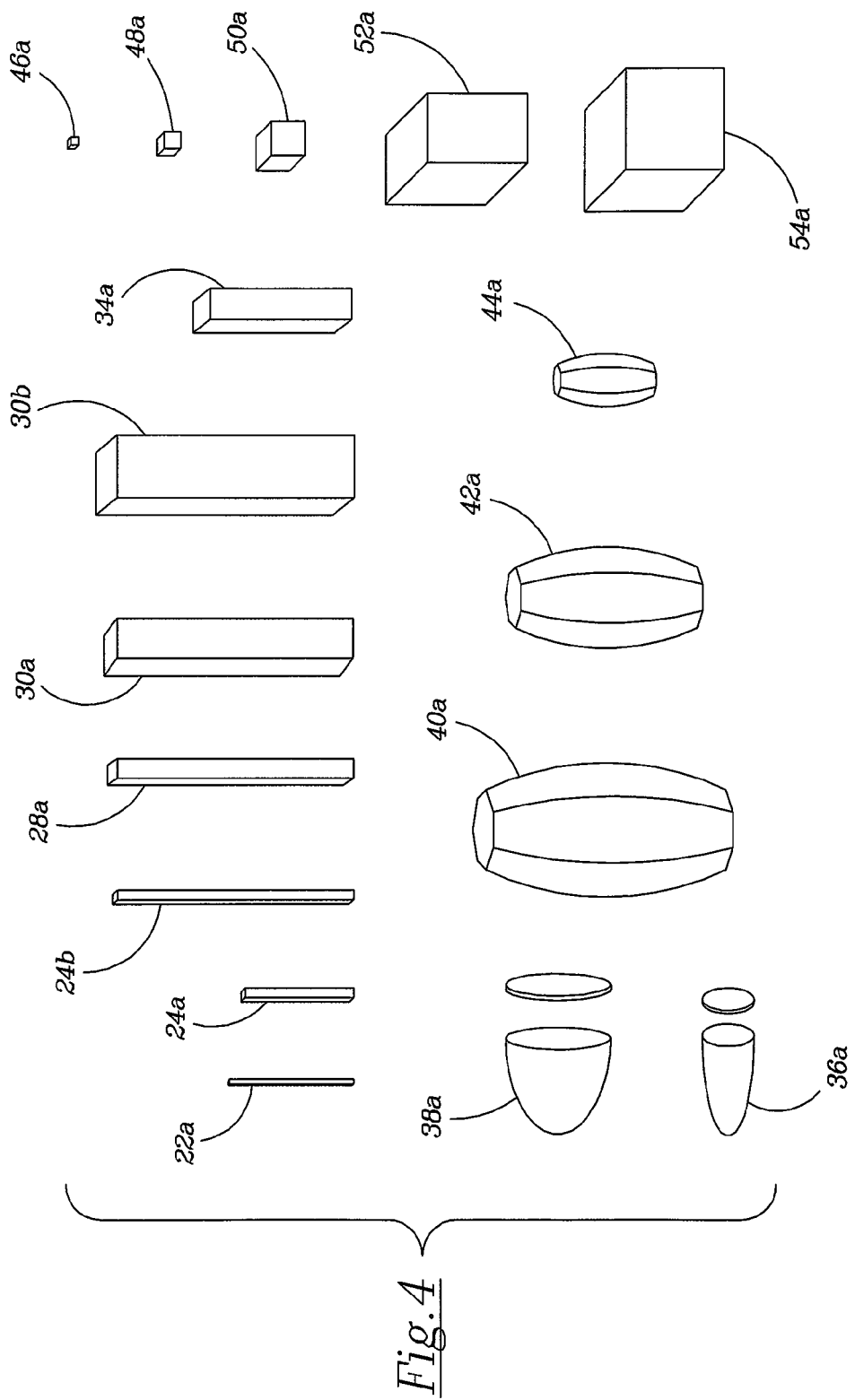

CULINARY CUTTING GUIDE

BACKGROUND OF THE INVENTION

The present invention is related to the skills of chefs and others in the art of cutting hard foodstuffs into substantially uniform shapes during food preparation. The use of the invention and the preparation of the foodstuffs into substantially uniform shapes falls into one or more of the culinary arts as practiced across the world.

Culinary art or arts has been a prominent part of worldwide history and culture. Culinary art, in which the word "culinary" means of or relating to a kitchen or to cookery and the word "art" may be described as the human effort to imitate, supplement, alter, or counteract the work of nature, is the art of the preparation, cooking and presentation of food, usually in the form of meals. This is an art for the reason that not just anyone can create inventive and delicious edible delights. The culinary arts have been continuously growing in interest and popularity and, as a result, a great number of students have begun to follow this career path.

If one is to become a culinarian or chef, there are a considerable number of techniques to learn, particularly those associated with the slicing and cutting hard vegetables commonly known as knife cuts or skills. The mastery of the ability to manipulate the various knives to achieve the precise desired cut requires a great deal of practice to acquire the proper techniques and skill set to be able to work efficiently. Today's cutting skills employ the use of historic French terminology as the accepted norm for identifying the different cuts and sizes of cuts classically utilized by chefs around the world. The standardized knife cuts are used when typically preparing, but not exclusively, root vegetables including potatoes, carrots, yams, sweet potatoes and others such as celery. The names for the knife cuts have been mostly adopted from the French and may include alumette, batonnete, brunoise, château, fondante, frite, julienne, mignonette, noisette, olivette, paille, parisienne, pont neuf and tourné. Other knife cut names or terms identifying the knife cuts commonly use in the culinary arts may include dice (large, medium and small), fine brunoise and fine julienne. The particular cut sizes and shapes will be discussed following with the description of the culinary cutting guide of the present invention.

How does an aspiring chef master the classic culinary vegetable knife cuts? Mastery of the various knife cuts can only be developed by repetition of the proper cuts. This has been previously accomplished by students through hours of trial-and-error practice under the guided supervision of a master instructor. Classroom instruction is only a part of the teaching regime as there are only a limited number of ways to develop the necessary muscle memory and fine motor skills to efficiently and perfectly execute the various knife cuts. Individual supervision is often the most effective way for the student to develop the necessary skill set. However, this takes an inordinate amount of time for the instructor to oversee the executed attempts of each student in a large class.

The present invention provides a useful self-guiding tool for use in practicing the knife cuts with much less supervision from an instructor decreasing the required time an instructor needs to spend with each student. To do this the present invention provides a cutting guide for matching each of the cuts actually performed by the student chef, not with a picture but with a physical guide or template against which the cut vegetables can be measured to determine whether the precise cuts have been achieved without continuous review by the instructor.

Further, the present invention is made of a material that is cleanable in order to adhere to the strict food service cleanliness regulations. Also, all of the various classic cuts are available on a single guide or template that can be held easily in one hand and be carried with the student in his or her knife bag. The guide or template can also be used for measuring other foodstuffs with rulers provided in both English and metric scales along with several common measurements provided by simple marking on one of the guide edges.

Other objects will appear hereinafter.

SUMMARY OF THE INVENTION

A culinary cutting guide for providing a plurality of predetermined sized and shaped apertures and cutout indentations for comparing the size and shape of classic cuts actually made with standard measurements for like classic culinary cuts. The culinary cutting guide may be comprised of a minimally flexible flat planar material having first and second sides and four edges. Each of the four edges houses one or more cutout indentations providing length, width and depth comparisons for a first plurality of classic solid rectangular and square culinary cuts. The flat planar surface has a plurality of apertures therethrough providing shape and diametric dimensions for a second plurality of classic round and multi-faceted culinary cuts. The flat planar material on either or both sides also contains a series of markings identifying the particular culinary cut associated with each of the plurality of cutout indentations and apertures and also provides additional markings of length measurements within the plurality of cutout indentations. The flat planar material on either or both sides also contains markings along two edges showing measuring rules in metric and English measurements.

The culinary cutting guide, in providing the first plurality of classic solid rectangular and square culinary cuts in one or more cutout indentations along each of the four edges of the guide, includes the classic culinary cuts paille, julienne, alumette, batonnette, frite, pont neuf, mignonette, fine brunoise, brunoise and small, medium and large dice. The culinary cutting guide, in providing the second plurality of classic round and multi-faceted culinary cuts in one or more apertures through the guide, includes the classic culinary cuts noisette, parisienne fondante (or château), and olivette.

The culinary cutting guide of claim further provides along a single edge of the guide a series of cutout indentations with shorter length cutout indentations nested within longer length cutout indentations, and also provides additional markings for similar length culinary cuts having differing widths or depths. The culinary cutting guide also provides with each of the cutout indentations along its four edges an associated cutout indentation for comparing the width and depth of the actual culinary cut to the standard measurement on the guide.

The culinary cutting guide further provides each aperture through the guide having a predetermined shape and size aperture for comparing the shape and size of the actual culinary cut to the standard measurement on the guide. Finally, the culinary cutting guide is made from a rigid or semi-rigid material having a thickness approximating 0.3125 inches to provide flexibility and that such material meets the standards for cleanliness in food preparation.

The present invention also provides a method for teaching and maintaining practice of accuracy in certain culinary cuts by providing a culinary cutting guide containing a plurality of predetermined sized and shaped apertures and cutout indentations for comparing the size and shape of classic cuts actually made with standard measurements for like classic culinary cuts. The culinary cutting guide permits each aperture and indentation to be used to visually compare an actual culinary cut of root vegetables and hard fruits through a physical comparison to the standard measurements by inserting the cut vegetables or fruits directly into or through the corresponding indentation or aperture of the cutting guide to determine accuracy of the desired cut to the standard measurement.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 2 is a plan view of a first side of the culinary cutting guide of the present invention.

FIG. 3 is a plan view of a second side of the culinary cutting guide of the present invention.

FIG. 4 is a perspective view of the various classic culinary knife cut shapes that are represented on the culinary cutting guide of the present invention.

DETAILED DESCRIPTION OF THE PREFERRED EMBODIMENTS

Figure 1:
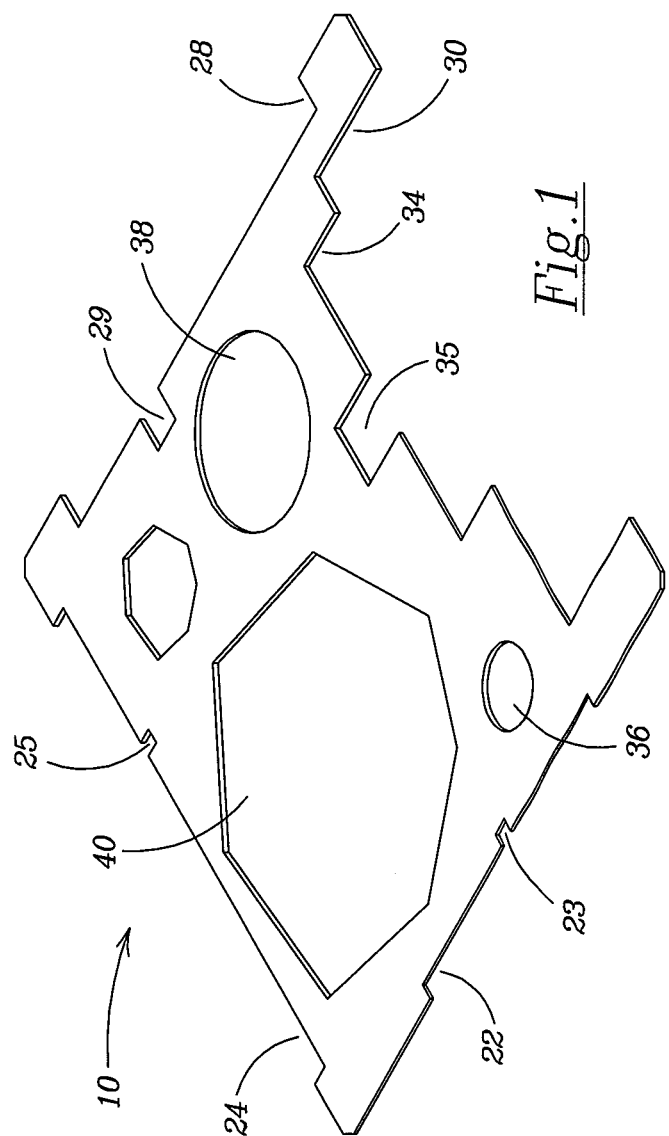
FIG. 1 is a perspective view of the culinary cutting guide of the present invention.

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 the culinary cutting guide 10 of the present invention showing a number of sized peripheral indentations and shaped apertures that are to be used in comparing the cuts actually made with the standard measurements provided by the guide. The guide 10 is approximately 1/32 inch in thickness [0.3125 inches] preserving a minimal flexibility. The guide can be manufactured from any rigid or semi-rigid material, such as a variety of polymer compositions, but stainless steel is preferred due to the rigid standards for cleanliness in food preparation areas. It is imperative in understanding this invention, that the reader understand and come to know the various classic cuts for which the guide provides the standard measurements in a visual comparative form.

Referring to FIG. 4, starting with the top row and progressing from left to right, there are a number of solid rectangular cut examples that can be made from rigid and semi-rigid vegetables and fruits. The first knife cut example is the paille cut 22a which is a 1/16 inch shred cut that is identified along one edge of the cutting guide 10 in FIG. 2 as an indentation or cutout 22. Approximately midway along the indentation 22 there is placed a notch or cutout 23 which measures 1/16 of an inch in width and 1/16 of an inch in depth to be used as a visual comparative guide for the overall thickness of the paille cut. The next knife cut example is the julienne cut 24a which is a solid rectangle measuring 1/8×1/8×1½ to 2 inches that is also identified along an edge of the cutting guide 10 in FIG. 2 as an indentation or cutout 24. The cutout 24 is 1/8 inch deep and extends along the edge for 3 inches to accommodate both the julienne and alumette cuts. The julienne cut 24a extends from one end of the cutout 24 to either the line indicator 26a for a 1½ inch length or to the line indicator 26b indicating a 2 inch measurement, both measurements stem from the more distant end of the cutout 24. Another notch or cutout 25 is positioned along the length of the indentation 24 which measures 1/8 of an inch in width and 1/8 of an inch in depth to be used as a guide for the overall thickness of the julienne and alumette cuts. The alumette cut 24b extends the entire distance of the cutout 24. The alumette cut 24b is a 1/8×1/8×3 inch knife cut producing a solid rectangle as shown in FIG. 4. The next knife cut is the batonnette cut 28a which measures 1/4×1/4×3 inches that is identified along another edge of the cutting guide 10 in FIG. 2 as an indentation or cutout 28. Another notch or cutout 29 is placed along the cutout 28 which measures 1/4 of an inch in width and 1/4 of an inch in depth to be used as a guide for the overall thickness of the batonnette cut.

The last three knife cuts are all gauged using indentations along the fourth side of the cutting guide 10. The next knife cut is the frite cut 30a which measures 1/2×1/2×3 inches that is identified along the remaining edge of the cutting guide 10 in FIG. 2 as a 3 inch long indentation or cutout 30. The frite cut 30a is further denominated for thickness by line indicators 32a and 32b positioned along the sidewalls of the indentation 30 at the ½ inch mark as shown in FIG. 3 on the second or reverse side of the cutting guide 10. The next knife cut is the pont neuf cut 30b which measures 3/4×3/4×3 inches that is identified along the fourth edge of the cutting guide 10 as the full depth of cutout 30 indicated on the first side of the guide 10. There are no notches or cutouts that provide a guide for the thickness of the frite or pont neuf knife cuts, but one end wall and the adjacent sidewall of the indentation 30 provide a similar guide indicating the 3/4 inch thickness for the pont neuf cut 30b as shown in FIG. 2. The last knife cut in the upper part of FIG. 4 is the mignonette cut 34a which measures 3/8×3/8×2 inches that is also identified along the fourth edge of the cutting guide 10 as a further indentation or cutout 34 extending inward beyond the indentation 30. A notch or cutout 35 is placed along the cutout 34 which measures 3/8 of an inch in width and 3/8 of an inch in depth to be used as a guide for the overall thickness of the mignonette cut. All of these knife cuts shown in the upper portion of FIG. 4 produce solid rectangular cuts of the root vegetables or fruits substantially in the shapes and sizes provided with example measurements reproduced on the cutting guide 10 for use by culinary students and chefs in the trade.

The lower portion of FIG. 4 provides another set of five classic knife cuts that are represented on the cutting guide 10. The first knife cut on the lower portion is the noisette cut 36a showing a spherical or elongated elliptical cut that provides a visual measurement of a ½ inch diameter by the aperture 36 in the cutting guide 10. The second knife cut is the parisienne cut 38a showing a spherical or elongated elliptical cut that provides another visual measurement of a 1 inch diameter by the aperture 38 in the cutting guide 10. Each of these cuts can be used to produce chips or rondelles, measured round disks, for use in salads or as garnishes. The apertures 36, 38 provide the visual guide for culinary students and chefs against which to measure their knife cuts of the standard classic cuts for the root vegetables or fruits. These apertures 36, 38 may also be used as a visual comparative guide for ½ inch diameter noisette spheres and parisienne 1 inch diameter spheres.

The next knife cut is the fondante cut 40*a* shown in FIG. 4 as a cylinder having outwardly extending elliptical sides and a flat top and bottom. The fondante cut 40*a* is 3 inches in height and is 7-sided, thus the strangely shaped aperture 40 shown in FIGS. 1, 2, and 3 that provide the visual measurement to culinary students and chefs for accuracy in making this classic knife cut with root vegetables or fruits. The next knife cut is the château cut 42*a* shown in FIG. 4 as a cylinder having outwardly extending elliptical sides and a flat top and bottom. The château cut 42*a* is 2 to 2½ inches in height and is 7-sided like the fondante cut 40*a*, but is smaller overall. The aperture 40 in the guide 10 can also be used to visually compare the 7-sided château cut 42*a* to the fondante cut 40*a* measurements to determine that the château cut 42*a* is smaller in overall width than the fondante cut 40*a*. The last knife cut in the lower portion of FIG. 4 is the olivette cut 44*a* is 1 to 2 inches in height and is 7-sided like the fondante cut 40*a* and château cut 42*a*, but smaller overall. The 7-sided shaped aperture 44 shown in FIGS. 1, 2, and 3 provides the visual measurement for the smaller olivette cut 44*a* to culinary students and chefs for accuracy in making this classic knife cut with root vegetables or fruits.

On the right of FIG. 4 is a vertical column of additional classic knife cuts. These cuts include the fine brunoise, brunoise, and small, medium and large dice cuts. All of these cuts are perfect solid square cuts. The fine brunoise cut 46*a* measures ⅟₁₆×⅟₁₆×⅟₁₆ in width, height and depth creating a solid square shape. This size solid square shape can be visually compared to the notch 23 on the cutting guide 10 to check for the accuracy of the cut. The next knife cut in the column on the right of FIG. 4 is the brunoise cut 48*a* that measures ⅛×⅛×⅛ inches in width, height and depth creating a solid square shape. This size solid square shape can be visually compared to the notch 25 on the cutting guide 10 to check for the accuracy of the cut. The next knife cut is the small dice cut 50*a* that measures ¼×¼×¼ inches in width, height and depth creating a slightly larger solid square shape. This size solid square shape can be visually compared to the notch 29 on the cutting guide 10 to check for the accuracy of the cut. The next knife cut is the medium dice cut 52*a* that measures ½×½×½ inches in width, height and depth creating a larger solid square shape. This size solid square shape can be visually compared to the line indicator measurements 32*a* or 32*b* on the reverse side of the guide 10 to check for the accuracy of the cut. The last classic knife cut is the large dice cut 54*a* that measures ¾×¾×¾ inches in width, height and depth creating the largest solid square shape. This size solid square shape can be visually compared to the depth of the sidewall of indentation 30 on the cutting guide 10 to check for the accuracy of the cut. The various classic solid square knife cuts can be checked for accuracy by the cutting guide 10 providing the visual comparison for culinary students and chefs against which to measure their knife cuts of the solid cuts of the root vegetables or fruits.

The guide also presents for the culinary students and chefs both English and metric measurement along two separate edges of the cutting guide 10. These measurements provide for the culinary student and chef a means to determine dimensions of their knife cuts and a comparison of these cuts against a standard classic knife cut measurements in either inches or millimeters. The standard measurements of the classic culinary cuts are provided to culinary students and chefs in both inches and millimeters so that the inch and millimeter measurement guides, 56, 58, respectively, provide the capacity for the practitioners to accurately measure the produced cuts in order to meet the culinary standards of practicing the classic cuts.

In practice the culinary cutting guide 10 is used to provide a visual comparison and measurement of the knife cuts made by the culinary student or chef against the classic cut standard measurements. A cut is made in the substantially rigid vegetable or fruit and then visually compared to the appropriate indentation or aperture along the edges or through the cutting guide 10 to determine practiced efficiency and correctness. In this manner, the standard sizes and shapes of the classic knife cuts are taught and maintained by both student and practitioner. The culinary cutting guide 10 is also quite different than making a comparison to pictures of the classic knife cuts, or to bare measurements, for the reason that the guide provides physically visual guidance for the comparisons between the knife cut physical shapes of the root vegetables and hard fruit and the standard measurements and shapes.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A culinary cutting guide for providing a plurality of predetermined sized and shaped apertures and cutout indentations for comparing the size and shape of classic culinary cuts actually made with standard measurements for like classic culinary cuts comprising:

a minimally flexible flat planar sheet material having first and second sides and four edges;

each of said four edges of said sheet material housing one or more cutout indentations providing length, width and depth comparisons for a first plurality of classic culinary cuts being solid rectangular and square culinary cuts with one edge of said four edges containing a series of cutout indentations with shorter length cutout indentations nested within longer length cutout indentations;

said flat planar sheet material having a plurality of apertures therethrough providing shape and diametric dimensions for a second plurality of classic culinary cuts being round and multi-faceted culinary cuts;

said flat planar sheet material containing markings identifying the particular culinary cut associated with each of the plurality of cutout indentations and apertures and also providing additional markings of length measurements within the plurality of cutout indentations; and said flat planar sheet material also containing markings along two edges showing measuring rules in metric and English measurements.

2. The culinary cutting guide of claim 1 wherein said first plurality of classic culinary cuts provided in said one or more cutout indentations along each of said four edges include the classic culinary cuts paille, julienne, alumette, batonnette, frite, pont neuf, mignonette, fine brunoise, brunoise and small, medium and large dice.

3. The culinary cutting guide of claim 1 wherein said second plurality of classic culinary cuts provided in said one or more apertures through the guide include the classic culinary cuts noisette, parisienne, fondante, château and olivette.

4. The culinary cutting guide of claim 1 wherein said one edge of the guide containing the series of cutout indentations with shorter length cutout indentations nested within longer length cutout indentations also displaying additional markings for similar length culinary cuts having differing widths or depths.

5. The culinary cutting guide of claim 1 wherein each cutout indentation along the four edges has an associated cutout indentation for comparing the width and depth of the actual culinary cut to the standard measurement on the guide.

6. The culinary cutting guide of claim 1 wherein each aperture through the guide provides a predetermined shape and size aperture for comparing the shape and size of the actual culinary cut to the standard measurement on the guide.

7. The culinary cutting guide of claim 1 wherein the guide is made from a rigid or semi-rigid sheet material having a thickness approximating 0.3125 inches to provide flexibility and that meets the standards for cleanliness in food preparation.

\* \* \* \* \*